(12) United States Patent
Kwak et al.

(10) Patent No.: US 8,896,234 B2
(45) Date of Patent: Nov. 25, 2014

(54) POWER SUPPLY APPARATUS AND DISPLAY APPARATUS INCLUDING THE SAME

(75) Inventors: Chang-kwun Kwak, Yongin-si (KR); Du-seong Kang, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 664 days.

(21) Appl. No.: 13/244,496

(22) Filed: Sep. 25, 2011

(65) Prior Publication Data

US 2012/0075359 A1  Mar. 29, 2012

(30) Foreign Application Priority Data

Sep. 27, 2010 (KR) ................ 10-2010-0093329

(51) Int. Cl.
*H05B 37/02* (2006.01)
*H02M 1/42* (2007.01)
*H02M 1/00* (2006.01)

(52) U.S. Cl.
CPC .... *H02M 1/4208* (2013.01); *H02M 2001/0032* (2013.01); *Y02B 70/126* (2013.01); *Y02B 70/16* (2013.01)
USPC ........... 315/308; 315/307; 315/247; 315/224; 345/102; 345/204; 345/212

(58) Field of Classification Search
CPC ............... H05B 37/02; H05B 33/0815; H05B 41/2827; H02M 7/53803; H02M 2001/0032; H02M 1/4208; Y02B 70/16
USPC ................ 315/308, 307, 291, 247, 224, 312; 345/102, 204, 211–21
See application file for complete search history.

(56) References Cited

U.S. PATENT DOCUMENTS

| | | | | |
|---|---|---|---|---|
| 5,454,112 A | * | 9/1995 | Kadono et al. | 713/340 |
| 6,947,024 B2 | * | 9/2005 | Lee et al. | 345/102 |
| 7,443,390 B2 | * | 10/2008 | Cha et al. | 345/211 |
| 7,764,022 B2 | * | 7/2010 | Ogura et al. | 315/291 |
| 8,432,105 B2 | * | 4/2013 | Takaki et al. | 315/291 |
| 2012/0223980 A1 | * | 9/2012 | Hollevoet et al. | 345/690 |

FOREIGN PATENT DOCUMENTS

| | | |
|---|---|---|
| JP | 2007-90832 A | 4/2007 |
| JP | 2007-101667 A | 4/2007 |

* cited by examiner

*Primary Examiner* — Haiss Philogene
(74) *Attorney, Agent, or Firm* — Sughrue Mion, PLLC (57) ABSTRACT

A power supply apparatus and a display apparatus including the same are provided. The power supply apparatus according to an exemplary embodiment includes a power factor correction circuit unit which corrects a power factor of input power and outputs the corrected power factor and a controller which controls whether to operate the power factor correction circuit unit according to an input status of a first signal indicating a status of power supplied to the display apparatus and an input status of a second signal indicating an operation status of a display unit included in the display apparatus.

20 Claims, 8 Drawing Sheets

| R1 | ON | ON | OFF | OFF |
|---|---|---|---|---|
| R2 | ON | OFF | ON | OFF |
| PFC Circuit | ON | OFF | OFF | OFF |

POWER SUPPLY APPARATUS AND DISPLAY APPARATUS INCLUDING THE SAME

CROSS-REFERENCE TO RELATED APPLICATION

This application claims priority from Korean Patent Application No. 10-2010-0093329, filed in the Korean Intellectual Property Office on Sep. 27, 2010, the disclosure of which is incorporated herein by reference.

BACKGROUND

1. Field of the Invention

Apparatuses consistent with exemplary embodiments relate to a power supply apparatus and a display apparatus including the same, and more particularly, to a power supply apparatus which may adjusts a power factor correction circuit to manage power efficiently and a display apparatus applying the same.

2. Description of the Related Art

In general, a power supply apparatus having a module which converts electricity provided from an external source to be suitable for supply to various electric apparatuses, such as a computer, a television, a video cartridge recorder, a converter, and a wireless communication apparatus, performs voltage control and relieves impact on high frequency that is higher than commercial frequency using semiconductor switching properties.

A power supply apparatus may be a liner power supply or a switching mode power supply (SMPS). The SMPS has been widely used in many electronic products as a main power supply since the 1990s since the SMPS is considered better for use in small apparatus and more efficient than the linear power supply.

The electric power supplied by a power supply apparatus is the product of voltage and current. The electric power includes active power, reactive power and apparent power. The apparent power is the product of voltage and current, and the active power represents actual power considering phase difference (A) between voltage and current due to a coil or a condenser during current alternation.

In the case of active power, only current in the same direction as voltage (=current*COS $\theta$) is actually applied. Accordingly, active power is voltage*(current*COS $\theta$). Herein, COS $\theta$ is a power factor.

Reactive power is the product of current in the direction of 90 degrees with respect to voltage (=current*SIN $\theta$) and voltage, and occupies part of capacity of an apparatus, doing nothing and consuming no power. Herein, SIN $\theta$ is a reactive power factor.

Power factor is the ratio of active power with respective apparent power, and represents how effectively voltage and current work in an electric apparatus.

If the power factor is high, that means active power is close to apparent power, and an electric apparatus is being utilized most efficiently from the perspective of a load (a receptor). The efficiency of power facility is also great from the perspective of a power supply (a supplier) since the supplier may release less current to the same load and thus, less voltage drop occurs.

A power factor correction (PFC) circuit is employed to perform power factor correction. However, since the PFC circuit always operates as long as power is supplied, the output efficiency of a power supply apparatus is low. Therefore, a method for enhancing output efficiency is required to reduce power consumption considering that the PFC circuit is provided in most electric products.

SUMMARY OF THE INVENTION

One or more exemplary embodiments provide a power supply apparatus which may improve the output efficiency by controlling the operation of a PFC circuit according to the status of a display apparatus and a displaying apparatus including the same.

According to an aspect of an exemplary embodiment, there is provided a power supply apparatus which provides power to operate a display apparatus, the power supply apparatus including a power factor correction circuit unit which corrects a power factor of input power and outputs the corrected power factor and a controller which controls on/off of the power factor correction circuit unit according to an input status of a first signal indicating a status of power supplied to the display apparatus and an input status of a second signal indicating an operation status of a display unit included in the display apparatus.

The apparatus may further include a determination unit which determines the input status of the first signal and the second signal.

The controller may turn on the power factor correction circuit unit only when both the first signal and the second signal are input.

The controller may turn on the power factor correction circuit unit only when both the first signal and the second signal are input and it is determined that there is no problem in the second signal.

The controller may control on/off of the power factor correction circuit unit when power is supplied to the display apparatus, determining that the first signal is input.

The controller may control on/off of the power factor correction circuit unit by determining whether the first signal is input based on a predetermined operation status of the display apparatus.

The controller may control on/off of the power factor correction circuit unit when power consumed in the display apparatus exceeds a predetermined amount of power, determining that the first signal is input.

The controller may control on/off of the power factor correction circuit unit when power consumed in the display apparatus exceeds 50% of power supplied to the display apparatus, determining that the first signal is input.

The controller may control on/off of the power factor correction circuit unit when power is supplied to a central processing apparatus formed in the display apparatus, determining that the first signal is input.

The controller may control on/off of the power factor correction circuit unit when power is input to the display unit formed in the display apparatus, determining that the second signal is input.

The controller may control on/off of the power factor correction circuit unit when a sync signal or a red, green, blue (RGB) signal for displaying an image is input to the display unit included in the display apparatus and the input signal is normal, determining that the second signal is input.

The controller may control on/off of the power factor correction circuit unit when a signal for operating a back light unit is input to the back light unit formed in the display apparatus and the input signal is normal, determining that the second signal is input.

The controller may control on/off of the power factor correction circuit unit when a TMDS data signal or a TMDS clock signal is input to a display unit formed in the display apparatus and the input signal is normal, determining that the second signal is input.

The controller may control on/off of the power factor correction circuit unit when an EDID or a DDC signal is input to a display unit formed in the display apparatus and the input signal is normal, determining that the second signal is input.

According to an aspect of another exemplary embodiment, there is provided a display apparatus including a display unit, and a power supply unit which supplies power to the driving unit and the display unit, and the power supply unit includes a power factor correction circuit unit which corrects a power factor of input power and outputs the corrected power factor and a controller which controls on/off of the power factor correction circuit unit according to an input status of a first signal indicating a status of power supplied to the display apparatus and an input status of a second signal indicating an operation status of a display unit.

The apparatus may further include a determination unit which determines the input status of the first signal and the second signal.

The controller may turn on the power factor correction circuit unit only when both the first signal and the second signal are input.

The controller may turn on the power factor correction circuit unit only when both the first signal and the second signal are input and it is determined that there is no problem in the second signal.

The controller may control on/off of the power factor correction circuit unit when power is supplied to the display apparatus, determining that the first signal is input.

The controller may control on/off of the power factor correction circuit unit when power is input to the display unit, determining that the second signal is input.

BRIEF DESCRIPTION OF THE DRAWINGS

The above and/or other aspects will be more apparent by describing exemplary embodiments with reference to the accompanying drawings, in which.

DETAILED DESCRIPTION

Certain exemplary embodiments are described in detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 1:
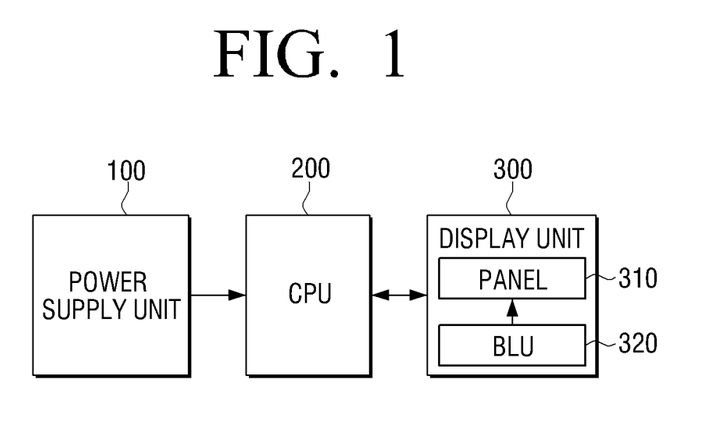
FIG. 1 is a block diagram illustrating a display apparatus according to an exemplary embodiment.

FIG. 1 is a block diagram illustrating the configuration of a display apparatus according to an exemplary embodiment. The display apparatus according to an exemplary embodiment includes a power supply unit 100, a central processing unit (CPU) 200, and a display unit 300. The display unit 300 includes a display panel 310 and a back-light unit (BLU) 320.

The power supply unit 100 supplies power to operate the display apparatus. The power supplied to the display apparatus may be input to the display unit 300 which outputs an image, the main function of a display apparatus, and the CPU 200 which controls the operation of the display unit 300. The power supply unit 100 may include a power factor circuit (not shown) which corrects power factor of input power. In addition, the power supply unit 100 determines whether to operate a power factor correction circuit based on a status of power provided to the CPU 200 and an operation status of the display unit 300.

Herein, the status of power provided to the CPU 200 includes whether power is supplied to the CPU 200 or the amount of power supplied to the CPU 200. Specifically, the state of power may be determined based on whether the power consumed in the CPU exceeds a predetermined power threshold or whether the power consumed in the CPU exceeds 50% of power supply.

In addition, the operation status of the display unit 300 represents whether or not the display unit 300 operates. More specifically, the operation status of the display unit 300 includes whether power is input to the display unit 300, whether a sync signal or an RGB signal to display an image is input to the display unit 300, whether a signal to operate the BLU 320 is input, whether a Transition Minimized Differential Signaling (TMDS) data signal or a TMDS clock signal is input, and whether Extended Display Identification Data (EDID) or a Display Data Channel (DDC) signal is input. The above signals may be used to determine whether the display unit 300 outputs image data and further determined whether an input signal is normal.

In particular, the power supply unit 100 may turn on a PFC circuit only when both a signal indicating the status of power provided to the CPU 200 and a signal indicating the operation status of the display unit 300 are input.

The CPU 200 controls the overall operation of a display apparatus. Although the main function of the CPU 200 is to control the display apparatus 300 to output an image, if the display apparatus has communication function, the CPU 200 may also control a communication unit (not shown) to perform communication with outside and control a storage unit (not shown) to store broadcast being received. In addition, the CPU 200 may also operate the display apparatus based on a user's input through an input unit such as a touch pad or a remote controller.

The display unit 300 includes the display panel 310 which receives an image signal and the BLU 320 which provides back-light to the display panel 310. If an image signal is input to the display panel 310, the BLU 320 provides back-light to output an image on the display panel 310 according to the image signal input to the display panel 310.

In FIG. 1, the display apparatus includes the power supply unit 100, but this is only an example. The power supply unit 100 may be an external apparatus connected to the display apparatus.

In addition, in FIG. 1, the power supply unit 100 turns on a PFC circuit only when both a signal indicating the status of power provided to the CPU 200 and a signal indicating the operation status of the display unit 300 are input. However, the power supply unit 100 may turn on a PFC circuit when one of these two signals is input.

Figure 2A:
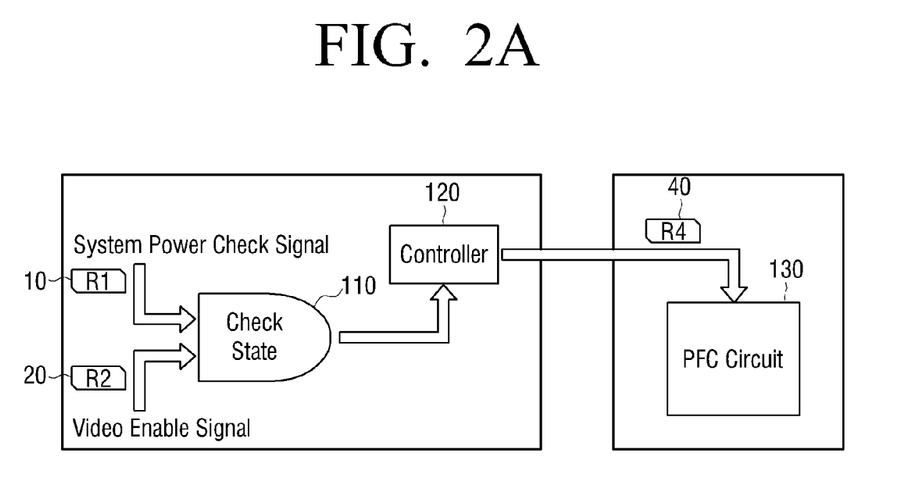
FIG. 2A is a diagram illustrating a power supply apparatus according to an exemplary embodiment.

Hereinafter, a method for controlling a PFC circuit in a power supply apparatus will be explained in detail with reference to FIGS. 2A, 2B, 2C and 3. FIG. 2A is a view illustrating the configuration of a power supply apparatus according to an exemplary embodiment.

As illustrated in FIG. 2A, the power supply apparatus according to an exemplary embodiment includes a power factor correction circuit unit 130 which corrects power factor, a controller 120 which controls on/off of the power factor correction circuit unit 130, and a determination unit 110 which determines the status of an input signal.

The power factor correction circuit unit 130 corrects the power factor of input power and outputs the corrected input power. However, whether to operate the power factor correction circuit unit 130 is determined by the controller 120, which will be explained in detail later.

The determination unit 110 determines whether an R1 signal 10 related to the power for operating the system of a display apparatus and an R2 signal 20 related to the operation of a display unit (e.g., the monitor) of a display apparatus are input or normally operate.

In the case of the R1 signal 10, the determination unit 110 may determine whether the R1 signal 10 indicating whether or not power for operating the system of a display apparatus is input.

For example, if a power signal is input as the power button of a system is pressed, the determination unit 110 determines that the R1 signal 10 is input. In addition, if a wake on LAN signal is input via network, the determination determines that the R1 signal 10 is input.

Additionally, whether or not the R1 signal is input may be determined based on the current status of a display apparatus by dividing the status of a system into S1 to S5. Specifically, S1 represents a status where power is supplied both to the monitor and system of the display apparatus, S2 represents a status where only the monitor is turned off, S3 represents a stand-by mode which is a power-saving mode. S4 represents a status where the system is in a hibernation state, and S5 represents a status both the system and monitor are turned off. In this case, it is determined that the R1 signal 10 is input in S1 and S2, and that the R1 signal 10 is not input in S3 to S5.

In addition, the determination unit 110 may determine that the R1 signal 10 is input when power is applied to a main chip such as a CPU while the system operates. The determination unit may also determine that the R1 signal 10 is input when a signal output from an apparatus such as a DC/DC converter is input while the system operates.

The determination unit 110 may also determine that the R1 signal 10 is input when the system consumes more than 50% of power consumption while the display apparatus operates based on the maximum current stipulated in a power supply apparatus.

The method for determining whether the R1 signal 10 is input will be explained in detail later with reference to the circuit diagram in FIG. 4.

In the case of the R2 signal 20, the determination unit 110 may determine whether the R2 signal 20 is input based on the operation status of the monitor.

Specifically, the determination unit 110 may determine that the R2 signal 20 is input when an H/V sync signal or an RGB signal is input when VGA is input since that means the monitor initiates its operation. However, if the input signal includes an error and thus, is not a normal signal, the determination unit 110 may determine that the R2 signal 20 is not input.

In addition, the determination unit 110 may determine that the R2 signal 20 is input when TMDS data of Digital Visual Interface (DVI) input or a TMDS clock signal is input since that means the monitor initiate outputting an image. However, if the input signal includes an error and thus, is not a normal signal, the determination unit 110 may determine that the R2 signal 20 is not input.

The determination unit 110 may also determine that the R2 signal 20 is input when TMDS data of High Definition Multimedia Interface (HDMI) input or a TMDS clock signal is input. However, if the input signal includes an error and thus, is not a normal signal, the determination unit 110 may determine that the R2 signal 20 is not input.

In addition, the determination unit 110 may determine that the R2 signal 20 is input when a DDC signal or an EDID signal is input. However, if the input signal includes an error and thus, is not a normal signal, the determination unit 110 may determine that the R2 signal 20 is not input.

The determination unit 110 may determine that the R2 signal 20 is not input when the monitor is turned off according to the power setting of the system.

As such, the determination unit 110 may determine whether or not the R1 signal 10 and the R2 signal 20 are input or an input signal is normal. The determination result of the determination unit 110 is transmitted to the controller 120, and the controller 120 generates a control signal R4 40 for controlling on/off of the power factor correction circuit 130 based on the determination result.

Figure 3:
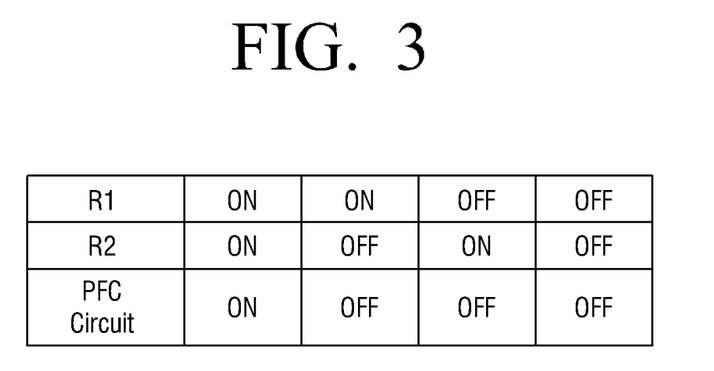
FIG. 3 is a table illustrating a method for controlling on/off of a power factor correction circuit in a power supply apparatus according to an exemplary embodiment.

FIG. 3 is a table illustrating a method for controlling on/off of the power factor correction circuit 130 based on the determination result of the determination unit 110.

As illustrated in FIG. 3, the controller 120 operates the power factor correction circuit unit 120 only when both the R1 signal 10 and the R2 signal are input and the input signal is normal. That is, if any one of the two signals is not input or any one of the input signals is erroneous, the power factor correction circuit unit 120 stops its operation.

However, the table illustrated in FIG. 3 is only an example of controlling the power factor correction circuit unit 120. The power factor correction circuit 120 may operate even if the R2 signal 20 is not input and only the R1 signal 10 is input, and vice versa.

Figure 2B:
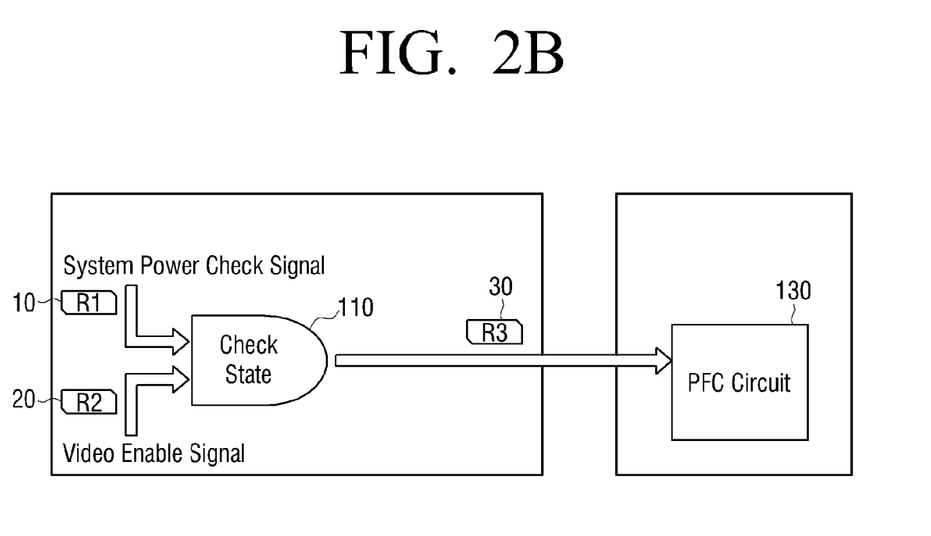
FIG. 2B is a diagram illustrating a power supply apparatus according to another exemplary embodiment.

FIG. 2B is a view illustrating the configuration of a power supply apparatus according to another exemplary embodiment.

Comparing with FIG. 2A, the configuration of the controlling 120 is omitted in FIG. 2B. That is, the control signal R3 30 for controlling the power factor correction circuit unit is transmitted directly to the power factor correction circuit unit 130 from the determination unit 110 without going through the controller 120.

Since the determination unit 110 determines only whether the R1 signal 10 and the R2 signal 20 are input or whether the input signals are normal, the determination may be performed simply through a calculator. That is, whether or not to generate the control signal R3 30 for controlling on/off of the power factor correction circuit unit 130 may be determined by setting input of each signal 10, 20 to '1' and input of no signal to '0'.

Figure 2C:
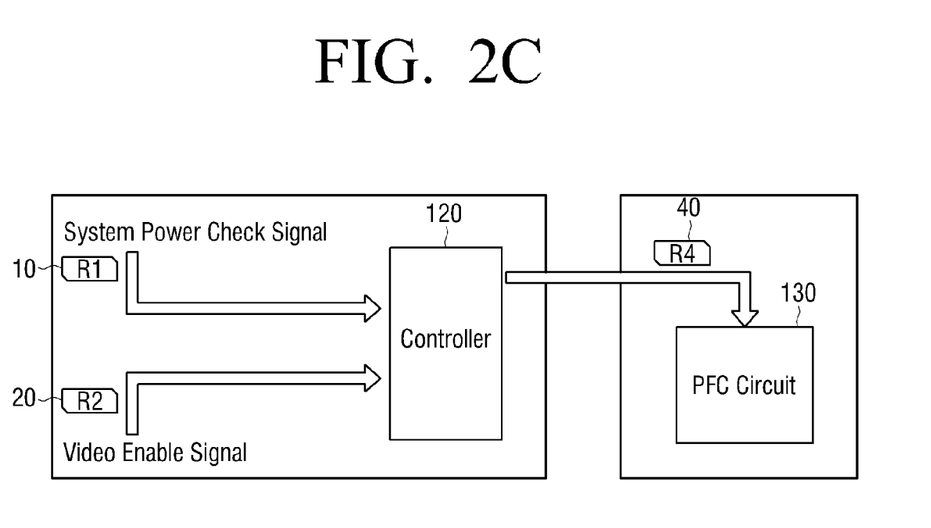
FIG. 2C is a diagram illustrating the configuration of a power supply apparatus according to another exemplary embodiment.

FIG. 2C is a view illustrating the configuration of a power supply apparatus according to another exemplary embodiment. Comparing with FIG. 2A, the configuration of the determination unit 110 is omitted in FIG. 2C. That is, the controller 120 directly performs determination regarding the R1 signal 10 and the R2 signal 20 which is the basis of generating the control signal R3 30 for controlling the power factor correction circuit unit 130.

Figure 4:
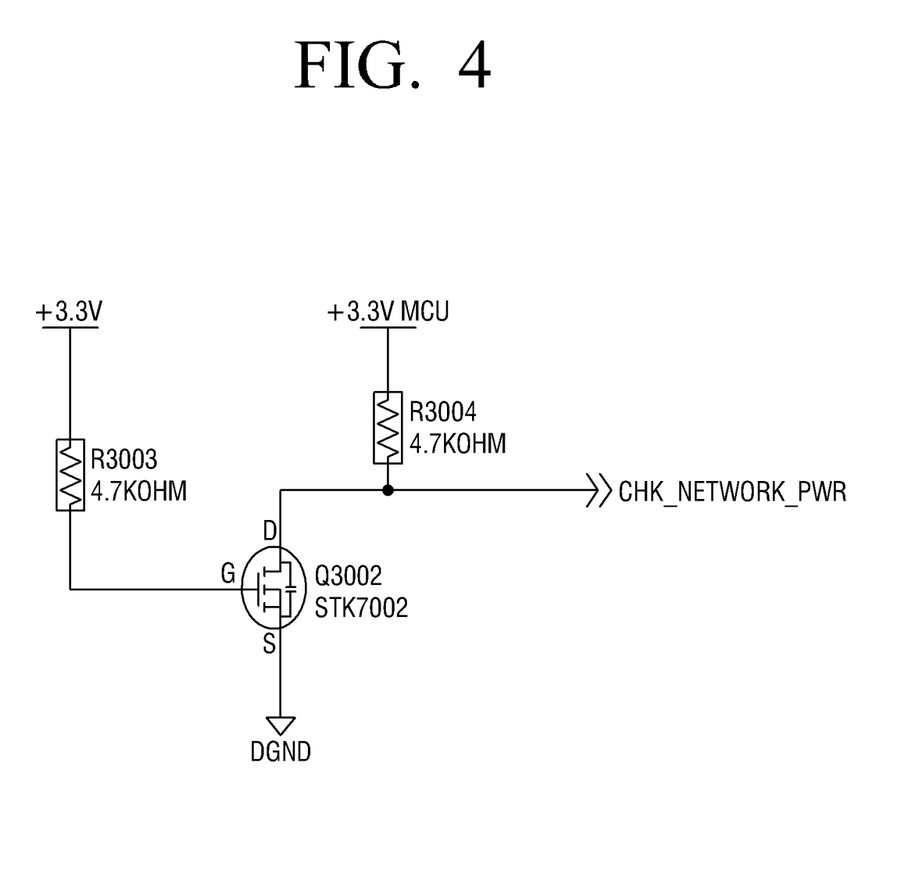
FIG. 4 is a circuit diagram illustrating the configuration of a circuit which determines whether an R1 signal is input in a power supply apparatus according to an exemplary embodiment.

FIG. 4 is a circuit diagram illustrating the configuration of a circuit which determines whether the R1 signal 10 is input in a power supply apparatus according to an exemplary embodiment.

The power which is generated when the system is boot is set to +3.3V and the power which is generated when a power code is connected is set to +3.3V MCU.

When the power code is connected, CHK_NETWORK_PWR output becomes 3.3V. However, if a user boots a system using a remote controller or a power button, Q3002 is turned on and thus, CHK_NETWORK_PWR falls to a ground (DGND) to become 0V. Accordingly, whether the system is being boot (0V) or whether the system is turned off (3.3V) may be determined using the CHK_NETWORK_PWR signal.

That is, whether the R1 signal 10 is input may be determined through the CHK_NETWORK_PWR signal.

However, the circuit configuration in FIG. 4 is only an example of determining whether the R1 signal 10 is input, and there could be other forms of circuit configuration. In the above description, whether various signals for determining whether the R1 signal 10 is input may also be determined based on the change in voltage or current.

The R2 signal 20 indicates whether the video signal of a video output apparatus is appropriate, and may perform the determination using a sync signal. The video signal includes a horizontal sync signal, a vertical sync signal, and a plurality of video signals. If a sync signal is not input or a sync frequency is not consistent, the corresponding video signal is determined to be an abnormal signal. In this case, it may be determined that the R2 signal 20 is not input.

Figure 5:
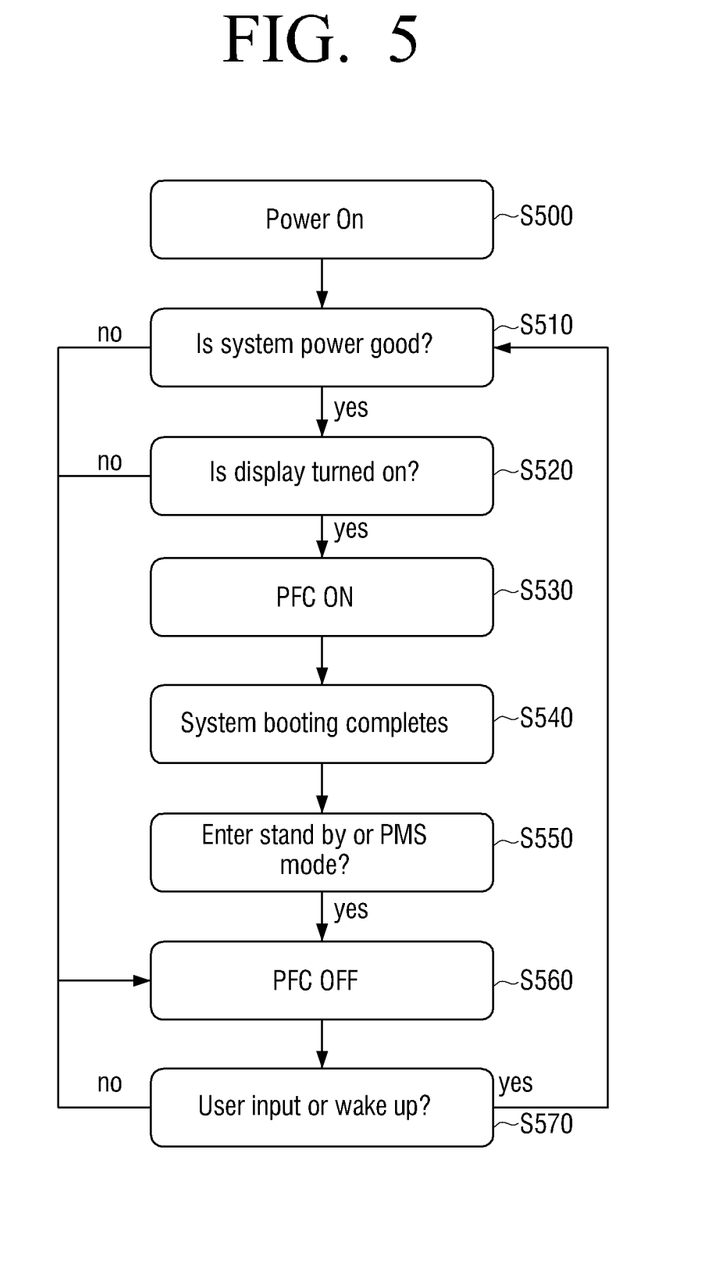
FIG. 5 is a flowchart illustrating a method for controlling a power factor correction circuit in a power supply apparatus according to an exemplary embodiment.

FIG. 5 is a flowchart illustrating a method for controlling the power factor correction circuit 130 in a power supply apparatus according to an exemplary embodiment. If the power of the system of a display apparatus is turned on (S500) by a user's command as the user presses a power button or manipulates a remote controller, the operating system or firmware inside the system is booted and power is provided to the monitor of the display apparatus.

Subsequently, it is determined whether there is any problem in the power of the system of the display apparatus (S510). If it is determined that there is a problem in the power of the system (S510—no), it is determined that the R1 signal 10 is not input and the power factor correction circuit unit 130 is turned off (S560).

If it is determined that there is no problem in the power of the system (S510-yes), it is determined whether the monitor of the display apparatus is operating normally, i.e., whether the monitor is turned on (S520). If it is determined that the monitor is not operating (S520—no), it is determined that the R2 signal 20 is not input and the power factor correction circuit unit 130 is turned off (S560).

If it is determined that the monitor is operating normally (S520-yes), this means it is determined that both the R1 signal 10 and the R2 signal 20 are input and thus, the power factor correction circuit unit 130 operates (S530).

If the system is booted (S540) and enters into a stand-by mode while the display apparatus operates (S550-yes), the power factor correction circuit unit 130 stops its operation (S560).

Subsequently, if a user's command is input again, or the stand-by mode is changed to an operation mode, the above operation is repeated.

Accordingly, the power factor correction circuit unit 130 operates only when the monitor operates normally while the system of the display apparatus operates simultaneously, and the power factor correction circuit unit 130 stops its operation if one of the monitor and the system does not operate. Therefore, power consumed in the power factor correction circuit unit 130 may be managed efficiently.

Figure 6:
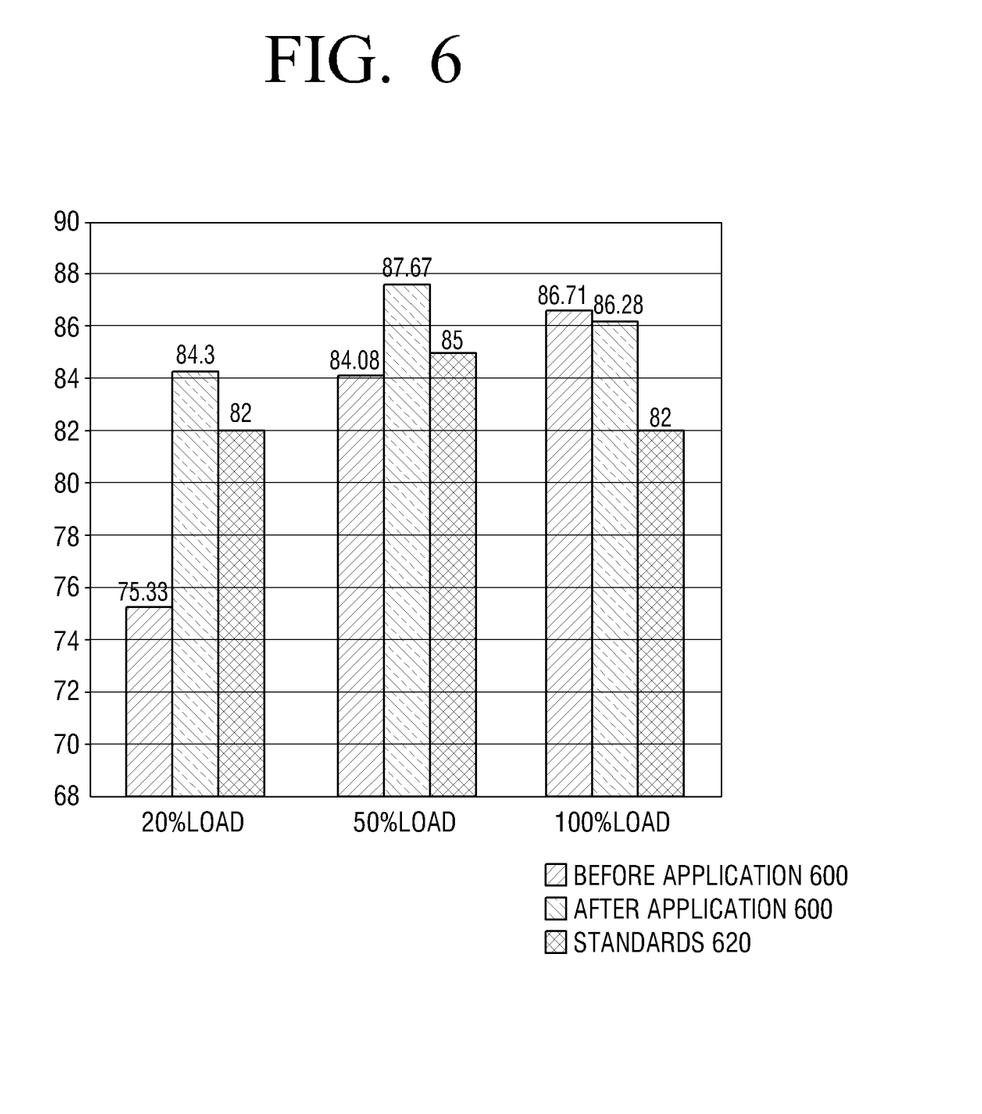
FIG. 6 is a graph illustrating the efficiency of a power supply apparatus according to an exemplary embodiment.

FIG. 6 is a graph illustrating the efficiency of a power supply apparatus according to an exemplary embodiment.

The PC standards of Energy Star 5.0 Regulation regarding energy efficiency focuses on improving efficiency of a power supply apparatus and requires a power supply apparatus to meet stricter conditions than before.

The bar 620 in the bar graph in FIG. 6 indicates standards that should be met when there are 20% load, 50% load, and 100% load respectively. That is, when the load is 20% and 100%, efficiency should be more than 82%, and when the load is 50%, efficiency should be more than 85%.

As shown in the exemplary embodiment, if the display apparatus is operated without adjustment on the power factor correction circuit unit 130 (which is called 'before application 600' hereinafter), efficiency does not satisfy the Energy Star 5.0 Regulation when the load is 20% and 50%.

However, if on/off of the power factor correction circuit unit 130 is adjusted based on the operation of the display apparatus, efficiency not only satisfies the Energy Star 5.0 Regulation when the load is 20%, 50%, and 100% but also shows much higher efficiency.

While a relate art display apparatus operates the power factor correction circuit unit 130 even when load is not so great, the power supply apparatus according to the exemplary embodiment turns off the power factor correction circuit unit 130 when load is small, thereby reducing power consumption and improving efficiency of the power supply apparatus.

As described above, according to the power supply apparatus and the display apparatus including the same of the exemplary embodiments, whether to operate a PFC circuit may be controlled based on the status of the display apparatus and thus, output efficiency of the power supply apparatus may be enhanced.

Although a few exemplary embodiments have been shown and described, it would be appreciated by those skilled in the art that changes may be made in this embodiment without departing from the principles and spirit of the inventive concept, the scope of which is defined in the claims and their equivalents.

What is claimed is:

1. A power supply apparatus which provides power to operate a display apparatus, the power supply apparatus comprising:
   a power factor correction circuit unit which corrects a power factor of input power and outputs the corrected power factor;
   a controller which controls whether to operate the power factor correction circuit unit according to an input status of a first signal indicating a status of power supplied to the display apparatus and an input status of a second signal to indicating an operation status of a display unit included in the display apparatus.

2. The apparatus as claimed in claim 1, further comprising:
a determination unit which determines the input status of the first signal and the input status of the second signal.

3. The apparatus as claimed in claim 1, wherein the controller controls the power factor correction circuit unit to operate only when both the first signal and the second signal are input.

4. The apparatus as claimed in claim 1, wherein the controller controls the power factor correction circuit unit to operate only when both the first signal and the second signal are input and it is determined that there is no problem in the second signal.

5. The apparatus as claimed in claim 1, wherein the controller determines that the first signal is input and controls whether to operate the power factor correction circuit unit when power is supplied to the display apparatus.

6. The apparatus as claimed in claim 1, wherein the controller controls whether to operate the power factor correction circuit unit by determining whether the first signal is input based on an operation status of the display apparatus.

7. The apparatus as claimed in claim 6, wherein the controller determines that the first signal is input and controls whether to operate the power factor correction circuit unit when power consumed in the display apparatus exceeds a predetermined amount of power.

8. The apparatus as claimed in claim 1, wherein the controller determines that the first signal is input and controls whether to operate the power factor correction circuit unit when power consumed in the display apparatus exceeds 50% of power supplied to the display apparatus.

9. The apparatus as claimed in claim 1, wherein the controller determines that the first signal is input and controls whether to operate the power factor correction circuit unit when power is supplied to a central processing apparatus included in the display apparatus.

10. The apparatus as claimed in claim 1, wherein the controller determines that the second signal is input and controls whether to operate the power factor correction circuit unit when power is input to the display unit formed in the display apparatus.

11. The apparatus as claimed in claim 1, wherein the controller determines that the second signal is input and controls whether to operate the power factor correction circuit unit when a sync signal or an RGB signal for displaying an image is input to a display unit formed in the display apparatus and the sync signal or the RGB signal is normal.

12. The apparatus as claimed in claim 1, wherein the controller determines that the second signal is input and controls whether to operate the power factor correction circuit unit when a signal for operating a back light unit is input to a back light unit included in the display apparatus and the signal is normal.

13. The apparatus as claimed in claim 1, wherein the controller determines that the second signal is input and controls whether to operate the power factor correction circuit unit when a Transition Minimized Differential Signaling (TMDS) data signal or a TMDS clock signal is input to a display unit formed in the display apparatus and the TDMS data signal and the TDMS clock signal is normal.

14. The apparatus as claimed in claim 1, wherein the controller determines that the second signal is input and controls whether to operate the power factor correction circuit unit when an Extended Display Identification Data (EDID) or a Display Data Channel (DDC) signal is input to the display unit included in the display apparatus and the EDID signal or the DDC signal is normal.

15. A display apparatus comprising:
a display unit which displays an input image; and
a power supply unit which supplies power to the display unit,
wherein the power supply unit comprises:
a power factor correction circuit unit which corrects a power factor of input power and outputs the corrected power factor; and
a controller which controls whether to operate the power factor correction circuit unit according to an input status of a first signal which indicates a status of power supplied to the display apparatus and an input status of a second signal which indicates an operation status of a display unit.

16. The apparatus as claimed in claim 15, further comprising:
a determination unit which determines the input status of the first signal and the input status of the second signal.

17. The apparatus as claimed in claim 15, wherein the controller controls the power factor correction circuit unit to operate only when both the first signal and the second signal are input.

18. The apparatus as claimed in claim 15, wherein the controller controls the power factor correction circuit unit to operate only when both the first signal and the second signal are input and it is determined that there is no problem in the second signal.

19. The apparatus as claimed in claim 15, wherein the controller controls determines that whether to operate the power factor correction circuit unit when power is supplied to the display apparatus.

20. The apparatus as claimed in claim 15, wherein the controller determines that the second signal is input and controls whether to operate the power factor correction circuit unit when power is input to the display unit apparatus.

* * * * *